Nov. 24, 1953
L. H. SCHULTZ
2,660,390
ANTIGLARE VISOR MOUNTING BRACKET
Filed Oct. 25, 1949
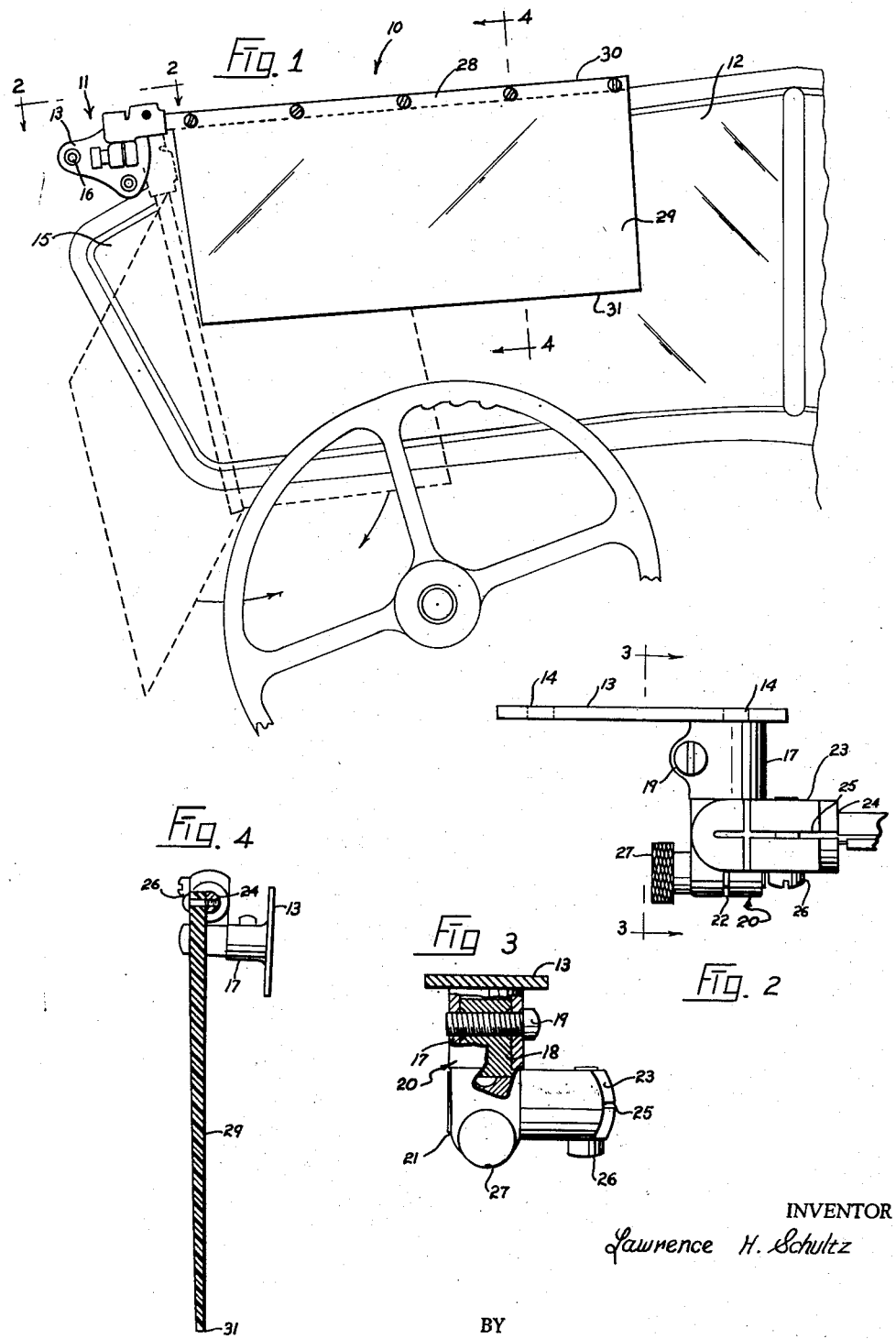
INVENTOR
Lawrence H. Schultz
BY
McMorrow, Berman & Davidson
ATTORNEYS

Patented Nov. 24, 1953

2,660,390

UNITED STATES PATENT OFFICE 2,660,390

ANTIGLARE VISOR MOUNTING BRACKET

Lawrence H. Schultz, Batavia, N. Y.

Application October 25, 1949, Serial No. 123,473

2 Claims. (Cl. 248—278)

This invention relates to an improved antiglare visor, and more particularly to such a visor which may be used for both daytime and nighttime driving.

An object of this invention is to provide a visor which may be positioned with respect to the windshield of a car so that it may be utilized during the daytime to eliminate the glare from sunlight, and during the nighttime to eliminate the glare of the head lamps of oncoming vehicles.

Another object of this invention is to provide a visor of elongated form which may be readily positioned vertically across the windshield of a car for nighttime driving and horizontally across the windshield of a car for daytime driving.

A further object of this invention is to provide a visor which may be utilized for nighttime driving, whereby the driver, while looking ahead through the visor, has clear vision of the lane of the highway in front of the car, and by simply turning his head has full view of both of the lanes of the highway.

A still further object of this invention is to provide a sun and headlight visor which has a gradual change of translucency between its opposed edges.

Other objects of the invention will become apparent by consulting the drawings in conjunction with the specification.

In the drawings:

Figure 1 is a side elevational view of a visor in accordance with the present invention adjustably mounted on the driver's side of the windshield of a car;

Figure 2 is an enlarged fragmentary top plan view of the visor taken along the line 2—2 of Figure 1;

Figure 3 is a sectional view, with parts broken away, taken along the line 3—3 of Figure 2;

Figure 4 is a sectional view taken along the line 4—4 of Figure 1.

Referring now more particularly to the drawings, wherein like reference numerals have been used throughout the several views, the numeral 10 designates an anti-glare visor in accordance with the present invention. As clearly shown in Figure 1, the visor is mounted on a bracket, generally indicated by the numeral 11, such that it may be positioned horizontally across a windshield 12 of a car for daytime driving, and vertically across the windshield 12, as shown by the broken lines, for nighttime driving, and vertically across the front left-hand side window of the car, as shown by the broken lines, to protect the driver from the sun from the left during daylight driving.

The bracket 11 includes a plate 13 provided with a plurality of holes, as indicated at 14. The plate 13 is positioned above the windshield 12 adjacent the corner 15 of the latter and fixedly secured to the adjacent portion of the interior of the car by means of screws 16 extending through the holes 14. Extending from the plate 13 and fixedly secured to the latter is the split socket 17 fabricated from resilient material.

Slidably received within the bore 18 of the socket 17 and mounted for rotation about an axis extending longitudinally of the housing 17 is a lug 20. Extending through the split portion of the socket 17 and threadedly received therein is a clamping screw 19 which may be rotated to slightly decrease or increase the cross-sectional area of the bore 18 to thereby frictionally engage and hold the lug 20. The lug 20 is provided with a transverse bore 21 extending therethrough, there being a slot 22 extending inwardly from the end of the lug 20 in communication with the bore 21.

Slidably received within the bore 21 of the lug 20 and mounted for rotation about an axis extending transversely of the lug 20 is an arm 23. A hand-actuable stud 27 extends through the wall of the lug 20 adjacent to the slot 22 and is threadedly received therein to vary the cross-sectional area of the bore 21 to thereby frictionally engage and hold the arm 23 in adjusted position. The arm 23 is provided with a longitudinal bore 24 extending partially therethrough, there being a slot 25 extending inwardly from the end of the arm 23 in communication with the bore 24.

Extending through the wall of the arm 23 adjacent the slot 25 and threadedly received in the opposite wall of the arm 23 is a set screw 26 which may be rotated to slightly increase or decrease the cross-sectional area of the bore 24. The anti-glare visor may be positioned in any desired position by merely rotating the lug 20 within the housing 17, adjusting the set screw 19 to hold the lug in a fixed position with respect to the housing 17, rotating the attaching member 23, adjusting the hand-actuable member 27, rotating the anti-glare visor 10 and finally adjusting the set screw 26.

The anti-glare visor 10 includes a rod 28 which has one end rotatably supported within bore 24 of the attaching member 23. Dependingly supported from the rod 28 is a wedge-shaped visor of translucent material, indicated by the numeral 29, which varies in thickness from its upper edge 30 to its lower opposed edge 31.

Referring now more particularly to Figure 4, there is shown a wedge-shaped visor 29 of increasing thickness from the upper edge 30 to its lower edge 31. Since the translucency of translucent materials is a function of the thickness of the material, it is readily apparent that the translucency of the visor 29 gradually increases from the upper edge 30 to the lower edge 31, and conversely, the translucency decreases from the lower edge 31 to the upper edge 30.

In actual use for daylight driving, the visor is positioned by adjusting the support 11 such that it extends longitudinally of the windshield 12. By raising and lowering his eye level with respect to the visor 29, the driver can view the road ahead through the desired translucent portion of the visor 29. The driver's position is determined by the intensity of the sunlight and other road conditions, such that he can comfortably view the road ahead without the ordinary discomfort caused by glare. As clearly shown by the broken lines in Figure 1, if the driver is annoyed by sunlight from the left while driving during the daytime, the visor 29 may be positioned with respect to the side window of the car to avoid this discomfort.

In actual use for nighttime driving, the visor may be positioned transversely of the windshield 12, as shown by the broken lines. In this position, the driver can view the road ahead through the desired translucent portion of the visor 29 by merely turning his head to the left or right. Accordingly, when the oncoming vehicle has extremely bright lights or high beams, the driver merely views the road through the portion of the visor 29 adjacent the edge 30, which, as previously pointed out, is the least translucent portion. If the driver wishes to view the road without the aid of the sun and headlight visor 10, in his position for nighttime driving, he merely turns his head to the right. Accordingly, the invention may be utilized for nighttime driving without the need of manual adjustment for compensating for the varying glare conditions.

Although one embodiment of the invention has been described, numerous modifications may be made without departing from the spirit of the appended claims.

What I claim is:

1. In an anti-glare visor mounting bracket, a plate adapted to be secured to a support adjacent to a windshield, a split socket fixed to and projecting from said plate with its axis normal to the plate, a lug rotatably engaged in said socket, means for contracting the socket to hold said lug in adjusted rotated position therein, said lug having a split end portion outside of said socket including a bore extending crosswise of said lug and communicating with the split of said end portion, an arm extending crosswise of said lug having a portion journaled in the bore of the split end portion of the lug, means for contracting said split end portion of the lug to hold said arm in an adjusted rotated position relative to the lug, said arm having a split tubular end portion, a visor plate mounting rod having an end rotatably inserted in the split end portion of the arm, and means for contracting the split end portion of the arm to hold the visor mounting rod in rotatably adjusted position.

2. In an anti-glare visor mounting bracket, a plate adapted to be secured in a vertical position to a support adjacent to a windshield, a first split socket fixed to and projecting at right angles from a side of said plate, a lug having an end engaged axially and rotatable in said first socket, means on said first socket for contracting said first socket to retain said lug in a selected rotated position, said lug having another end outside of the end of the first socket remote from said side of said plate, said other end of the lug having thereon a second split socket extending crosswise with respect to said lug, an arm having a lateral portion axially and rotatably engaged in said second socket, said arm having a longitudinal portion extending at right angles to said lateral portion, means on said second socket for contracting said second socket to retain said lateral portion of said arm in selected rotated position, said longitudinal portion of said arm having a third split socket arranged axially of said longitudinal portion, a visor plate rod having an end axially and rotatably engaged in said third socket, and means for contracting said third socket for retaining said rod in a selected rotated position.

LAWRENCE H. SCHULTZ.

References Cited in the file of this patent

UNITED STATES PATENTS

| Number | Name | Date |
|---|---|---|
| 1,311,278 | Holdsworth | July 29, 1919 |
| 1,320,395 | Kaufmann | Nov. 4, 1919 |
| 1,898,276 | Van Dresser | Feb. 21, 1933 |
| 2,235,421 | Devine | Mar. 18, 1941 |
| 2,239,158 | McCloud | Apr. 22, 1941 |
| 2,454,613 | Peltier et al. | Nov. 23, 1948 |